(12) United States Patent
Marin

(10) Patent No.: US 10,210,574 B2
(45) Date of Patent: Feb. 19, 2019

(54) CONTENT MANAGEMENT CHECKLIST OBJECT

(75) Inventor: Mike A. Marin, Laguna Hills, CA (US)

(73) Assignee: International Business Machines Corporation, Armonk, NY (US)

(*) Notice: Subject to any disclaimer, the term of this patent is extended or adjusted under 35 U.S.C. 154(b) by 182 days.

(21) Appl. No.: 12/825,326

(22) Filed: Jun. 28, 2010

(65) Prior Publication Data
US 2011/0320502 A1    Dec. 29, 2011

(51) Int. Cl.
G06F 17/30    (2006.01)
G06Q 40/08    (2012.01)

(52) U.S. Cl.
CPC ................... G06Q 40/08 (2013.01)

(58) Field of Classification Search
None
See application file for complete search history.

(56) References Cited

U.S. PATENT DOCUMENTS

| | | | |
|---|---|---|---|
| 5,530,861 A * | 6/1996 | Diamant et al. | 705/7.21 |
| 5,899,978 A * | 5/1999 | Irwin | G06Q 10/087 700/233 |
| 7,159,206 B1 * | 1/2007 | Sadhu et al. | 717/101 |
| 7,171,664 B2 | 1/2007 | Wang et al. | |
| 7,594,082 B1 | 9/2009 | Kilday et al. | |
| 7,599,964 B1 * | 10/2009 | Bozek et al. | |
| 7,657,887 B2 | 2/2010 | Kothandaraman et al. | |
| 2004/0030726 A1 | 2/2004 | Baxter et al. | |
| 2004/0205075 A1 | 10/2004 | LaTurner et al. | |
| 2005/0019740 A1 | 1/2005 | Cunningham et al. | |
| 2005/0060281 A1 * | 3/2005 | Bucher et al. | 707/1 |
| 2005/0066358 A1 | 3/2005 | Anderson et al. | |
| 2006/0089938 A1 | 4/2006 | Leonard et al. | |
| 2006/0265398 A1 | 11/2006 | Kaufman | |
| 2008/0077850 A1 | 3/2008 | Gauthier et al. | |
| 2008/0270477 A1 * | 10/2008 | Starkey et al. | 707/104.1 |
| 2009/0112938 A1 | 4/2009 | Petri | |
| 2009/0172696 A1 | 7/2009 | Meliksetian et al. | |
| 2009/0192869 A1 | 7/2009 | Irvine et al. | |

OTHER PUBLICATIONS

Cao, J., H.M. Tweeddale, & P.K. Walsh, "Improving Management Control of Process Hazards through Structured Monitoring and Auditing Protocols", Dev. Chem. Eng. Mineral Process., 8(1/2), 2000, 18 pp.

(Continued)

*Primary Examiner* — Anhtai V Tran
(74) *Attorney, Agent, or Firm* — Janaki K. Davda; Konrad, Raynes, Davda & Victor LLC

(57) ABSTRACT

Provided are techniques for storing at least one checklist object that includes one or more placeholders that each are associated with an object stored and managed by a content management system, receiving an indication that a new content object has been created in the content management system or that an existing content object has been modified or has reached a certain status in the content management system, in response to determining that the new content object or the change in the status fulfills one or more placeholders, marking each of the one or more placeholders as fulfilled, and indicating that the checklist object is complete when the one or more placeholders have been fulfilled.

15 Claims, 8 Drawing Sheets

(56) References Cited

OTHER PUBLICATIONS

IBM Corp., "Data Capture and Event Logging to Support Event Framework of Content Management System", May 12, 2009, IP.com No. IPCOM000183013D, 4 pp.

IBM Corp., "Self Monitoring and Reporting Content Manager Environment", Feb. 21, 2007, IP.com No. IPCOM000146771D, 3 pp.

US Patent Application file Jun. 28, 2010, entitled "Modeling for Event Enabled Content Management Systems", invented by M.A. Marin, 34 pp.

Yan, Y., S.C. Wan, Y. Yang, and T. Huang, "Configurable CMS Document Lifecycle Management Method", Jisuanji Gongcheng/ Computer Engineering, vol. 34, No. 22, Nov. 2008, 1 pg. [Abstract].

* cited by examiner

CONTENT MANAGEMENT CHECKLIST OBJECT

BACKGROUND

1. Field

Embodiments of the invention relate to a content management checklist object.

2. Description of the Related Art

A content management system (CMS), also known as an enterprise content management system (ECMS), may be described as a software system used to store and manage content objects in a computer system. The content objects stored and managed by the content management system consist of any type of computer files in any computer readable format, including text files, documents, picture files, video files, sound files, etc. In addition to files, the content management system may also manage other types of objects, including folders, versions, etc. In general, the files and other objects are called content objects. The content management system can maintain multiple versions of the content objects managed and meta-data for each content object. The content management system allows users (e.g., humans and machines) to create, access, modify, and delete content objects, among other operations. For content objects, such as files, the object repository contains metadata including the one or more locations of content elements that represent the actual content (e.g., text of a document object). The content elements may be stored in a separate storage repository, outside of the content management system.

In content management systems, a typical pattern is to wait for a set of content objects to be created or to reach a particular state to trigger (or raise) an action. Content objects include document objects, folder objects, and link objects. For example, in a car insurance claims processing system, implemented using a content management system, a set of documents have to be available for the claim to be processed. Such documents may include a first notice of loss, a police report, witness statements, etc. This pattern of waiting is common in different kinds of content management applications, programs or business processes in which documents or other content objects need to be created or reach a certain state for an action to be taken.

Content management applications are applications built using a content management system. For example, a vendor may sell a content management system, and the buyer may build a management application to solve a business problem using the content management system. A content management application is composed of one or more programs.

In conventional content management systems, a program (of a content management application) may wait for a set of one or more desired content objects. In such conventional content management systems, when a new content object is created or when an existing content object reaches a certain status, the program that is waiting checks on whether the new content object or changed existing content object fulfills the set of desired one or more content objects for which the program has been waiting. If the set of desired one or more content objects is fulfilled (i.e., all desired content objects have been received and reached the desired states), then, the program either processes the received one or more content objects or triggers another action. This is done in two modes: 1) a pull mode in which the program periodically (e.g., every few seconds, minutes, or hours) check for whether new content objects have been created or existing content objects have had their status changed or 2) a push mode in which the program listens to the events issued by the content management system and determines whether the content objects in the set of one or more desired content objects are available and/or have reached the desired state.

Such conventional solutions are inefficient because an external program has to keep track of the activity happening in the content management system to take the desired action.

Thus, there is a need for a content management checklist object.

BRIEF SUMMARY

Provided are a method, computer program product, and system for storing at least one checklist object that includes one or more placeholders that each are associated with an object stored and managed by a content management system, receiving an indication that a new content object has been created in the content management system or that an existing content object has been modified or has reached a certain status in the content management system, in response to determining that the new content object or the change in the status fulfills one or more placeholders, marking each of the one or more placeholders as fulfilled, and indicating that the checklist object is complete when the one or more placeholders have been fulfilled.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
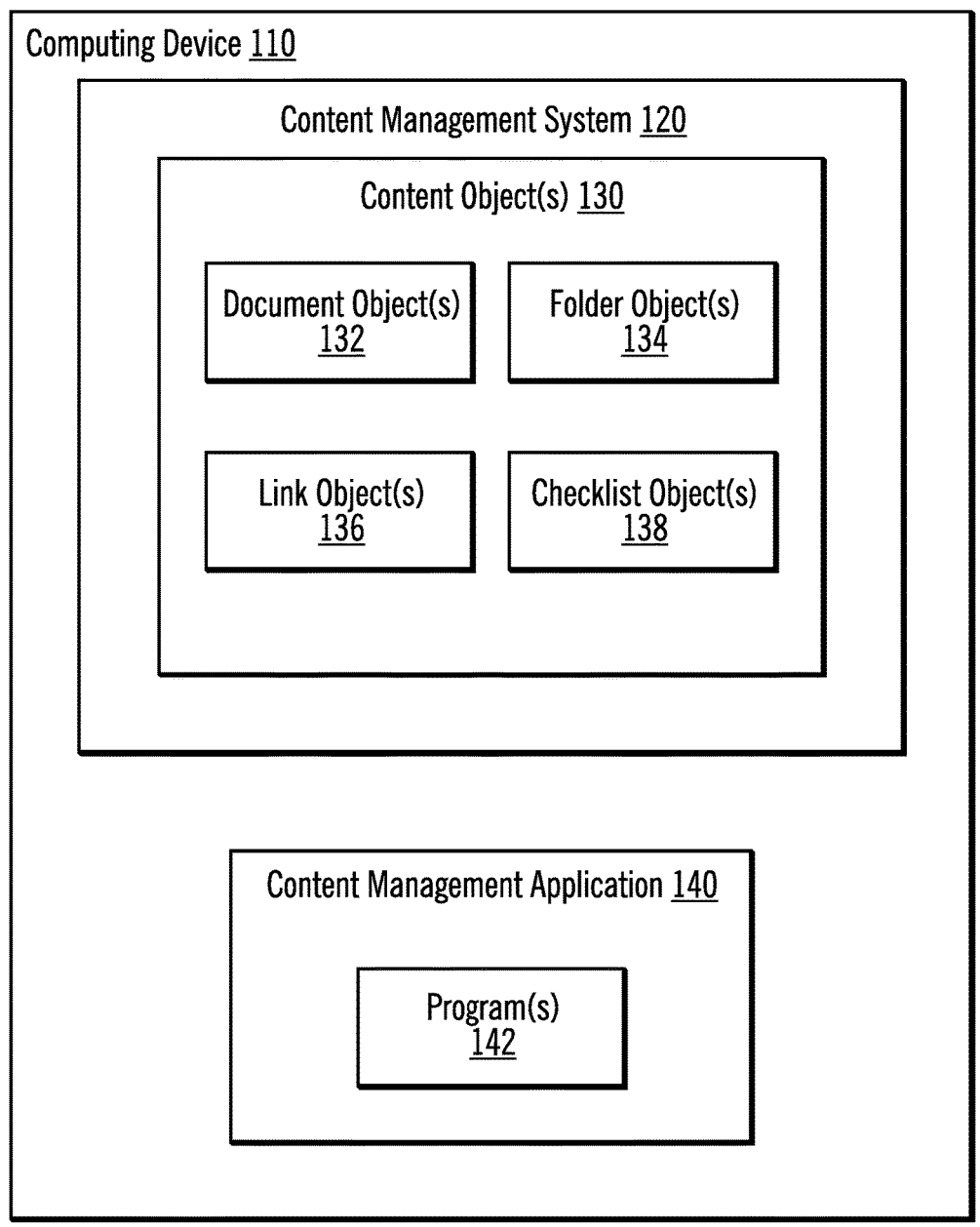
FIG. 1 illustrates a computing device in accordance with certain embodiments.

FIG. 1 illustrates a computing device 110 in accordance with certain embodiments. The computing device 110 includes a content management system (CMS) 120 and a content management application 140. The content management application 140 includes one or more programs 142. Although the content management application 140 and one or more programs 142 are illustrated at computing device 110, they may be in a separate device from the content management system 120. The content management system 120 stores and manages one or more content objects 130. The one or more content objects 130 may include, among others, one or more document objects 132, one or more folder objects 134, one or more link objects 136, and one or more checklist objects 138. That is, the objects 132, 134, 136 are not exhaustive and other objects may be included in the one or more content objects 130.

Embodiments add a checklist object 138 to the existing types of objects stored by the content management system 120. In certain embodiments, the checklist object 138 may be defined using object-oriented programming techniques. The content management system 120 is used to store content objects (e.g., text documents, pictures, videos, sound files, etc). With embodiments, the content management system stores multiple types of objects organized into at least the following types:

1. Document objects 132 (e.g., a document, a picture, a video, etc.). In this context, a content object may be described as any type of digital object or computer file in any computer readable format, including text files, documents, picture files, video files, sound files, etc. There may be multiple versions of a document object 132.

2. Folder objects 134 (also referred to as container objects) (e.g., to store content objects and other folder objects). Folder objects 134 provide a way to organize the documents and other folder objects 134.

3. Link objects 136 (also referred to as relationships objects). Link objects 136 allow users of the content management system 120 to create relationships between any type of content objects 130 (including other link objects 136, document objects 132, folder objects 134, and checklist objects 138) in the content management system 120.

4. Checklist objects 138. Embodiments add a new type of object, a checklist object 138, which is defined with placeholders to reference the content objects required before a desired action takes place.

Figure 2:
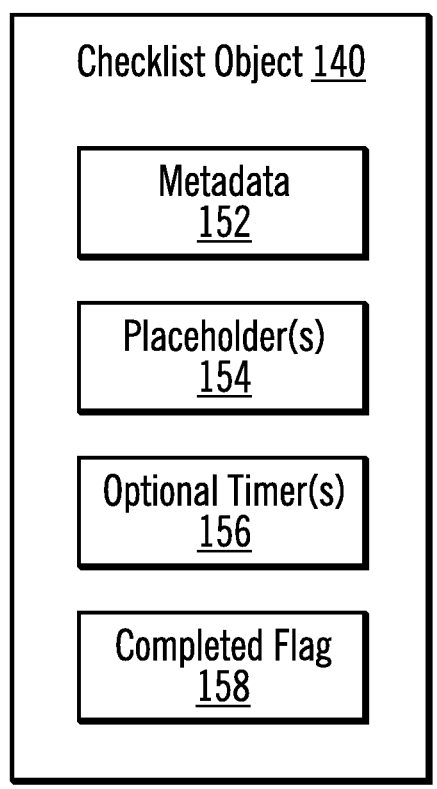
FIG. 2 illustrates an example checklist object in accordance with certain embodiments.

The content management system 120 allows users (e.g., humans and machines) to create, access, modify, and delete content objects 130, among other operations. FIG. 2 illustrates an example checklist object 138 in accordance with certain embodiments. The checklist object 138 contains metadata 152, one or more placeholders 154, zero or more timers 156, and a completed flag 158.

The metadata 152 is used to identify a particular checklist object 138. Other types of objects in the content management system 120 may also have associated metadata.

The placeholders 154 reference the content objects 130 required to complete the checklist. The new checklist object 138 contains placeholders 154 for other types of objects (including other checklist objects, content objects, folder objects, and link objects). There is one placeholder for each individual object (e.g., if the checklist object is waiting for two folder objects and one content object, there are three placeholders 154). When all the placeholders 154 have been fulfilled, then the checklist object 138 is complete (e.g., desired content objects have been received and/or reached the desired states).

A placeholder 154 in the checklist object 138 has a description of how that placeholder 154 can be fulfilled. Some placeholders 154 may require a specific document or folder to fulfill the placeholder 154, while other placeholders 154 may be conditional and accept one of multiple (e.g., two or three) objects for fulfillment.

A placeholder 154 in the checklist object 138 is populated when objects managed by the content management system 120 (e.g., documents, folders, etc.) fulfill the requirement specified in the placeholder 154. For example, a placeholder 154 that specifies that a police report with a case-number attribute corresponding to a particular expression should be present will be satisfied when such a document is created with case-number attribute set to the value that matches the expression or when an existing police report document case-number attribute is set to the value that matches the expression.

An example placeholder 154 may be specified as requiring either a police report with an attribute of case-number equal to the checklist attribute of cnumber or a waiver document with an attribute of case-number equal to the checklist attribute of cnumber, or a court order document with an attribute of case-number equal to the attribute of cnumber. The placeholder 154 is satisfied when one of the three conditions occurs; otherwise, the placeholder 154 is not satisfied.

A placeholder 154 may have additional characteristics (e.g., a particular placeholder 154 may be optional or non-optional). Embodiments distinguish between required (i.e., non-optional) and optional placeholders 154 by, for example, setting a flag in each placeholder 154. Optional placeholders 154 are always satisfied. The checklist object 138 is indicated as complete when required (i.e., non-optional) placeholders have been fulfilled, even if optional placeholders have not been fulfilled.

Figure 3:
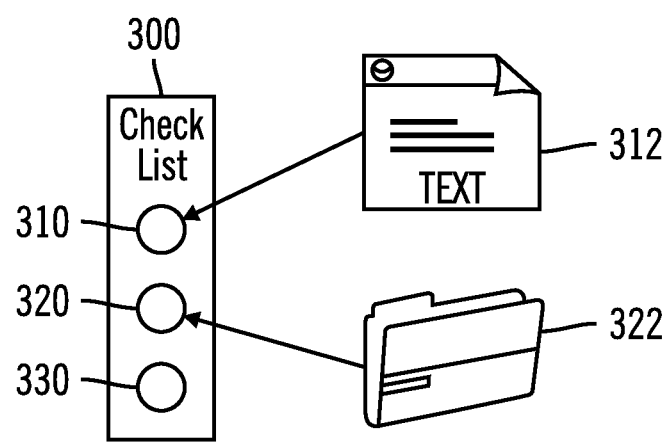
FIG. 3 illustrates a sample checklist object that is partially fulfilled in accordance with certain embodiments.

When all the placeholders 154 of the checklist object are fulfilled, the checklist object is said to be complete. FIG. 3 illustrates a sample checklist object 300 that is partially fulfilled in accordance with certain embodiments. In FIG. 3, the checklist object 300 has three placeholders 310, 320, 330. Placeholder 310 has been fulfilled with a document 312, and placeholder 320 has been fulfilled with a folder object 322. Placeholder 330 is waiting to be fulfilled. FIG. 3 provides a graphical representation of the checklist object 300 for presentation to a user.

In event driven content management systems 120 (i.e., ones that that generate events), an event may be generated when the checklist object 138 reaches the complete state. In such content management systems 120, the checklist object 138 may have one or more timers 156 associated with the checklist object 138. A timer 156 may be described as a chronometer that counts time and has an expiration time. When a timer 156 expires, an event indicating that the timer 156 has expired is triggered or raised. Before a timer 156 expires, the timer 156 may be stopped, in which case no event is triggered or raised. For example, a checklist object 138 may have a timer 156 for five days to indicate the checklist object should become complete within five days. Therefore, when configuring a timer 156, a start condition and a stop condition are indicated, in addition to other timer properties (e.g., name, etc.).

Checklist objects 138 may have several different types of timers 156, depending on when the timer 156 starts counting time and when the timer 156 stops counting time. Timers 156 may be started or stopped by the activity that happens in the checklist object 138. In certain embodiments, timers 156 may start when the checklist object 138 is created, when the checklist object 138 is completed, or when a particular 154 placeholder is fulfilled. In certain embodiments, timers 156 may be stopped when the checklist object 138 is completed or when a placeholder 154 is fulfilled. For example, a timer 156 may be configured to start when the checklist object 138 is created and is canceled (i.e., stopped) when the checklist object 138 reaches the complete state.

Thus, in an event driven content management system 120, an event can be generated when the checklist object 138 is completed, and that event triggers or raises a desired action.

In certain embodiments, the checklist object 138 generates a checklist completed event when the checklist object 138 reaches a completed state. For example, for each required placeholder, the checklist object 138 may set an indicator to TRUE (e.g., a bit to TRUE) to indicate that the required placeholder 154 has been fulfilled, and, when all the indicators are set to indicate that the placeholders 154 have been fulfilled, the checklist object 138 generates the checklist completed event.

In content management systems 120 that do not use timers 156 in the checklist object 138, then the checklist object 138 generates the checklist completed event when the checklist object 138 reaches a completed state.

In a non-event driven content management system 120, the program 142 checks the single checklist object 138, and not individual content objects, to determine whether all required content objects have been received and/or are in a desired state. In the non-event driven content management system 120, if the checklist object is complete, then the program 142 performs the desired action. That is, in the non-event driven content management system 120, the checklist object 138 has a completed flag 158 indicating whether the checklist object 138 is completed, and the program 142 checks this completed flag 158 to determine whether the checklist object 138 is completed. In certain embodiments, the non-event driven content management system 120 has one or more timers 156, and a timer expiration for each timer sets a flag indicating the timer 156 has expired. Then, a program 142 can check that flag to determine whether the timer expired.

Figure 4:
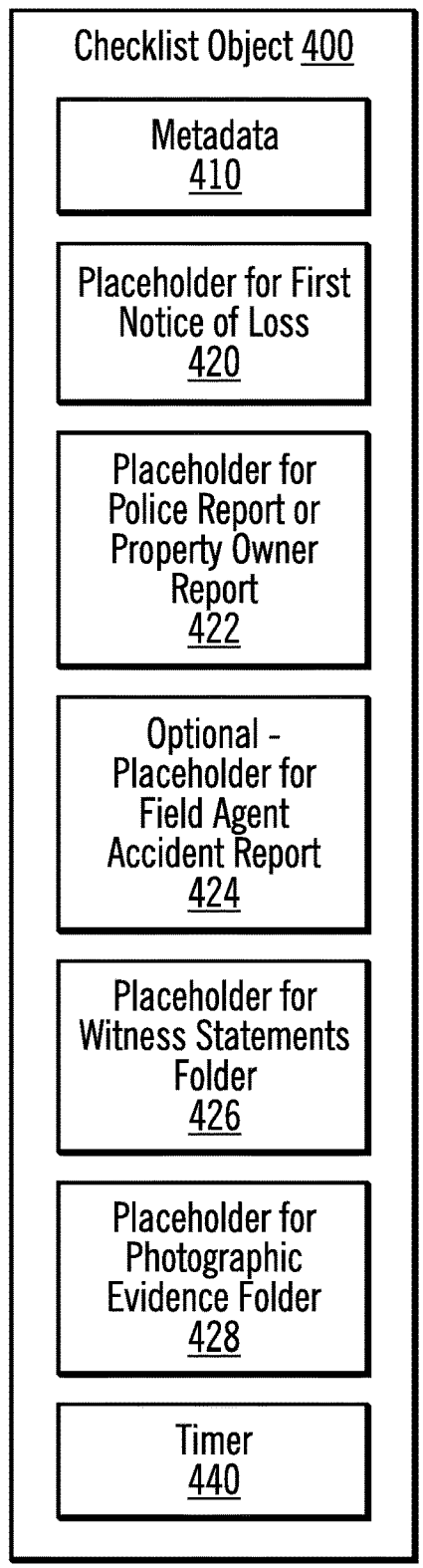
FIG. 4 illustrates an example checklist object for a car insurance claim in accordance with certain embodiments.

FIG. 4 illustrates an example checklist object 400 for a car insurance claim in accordance with certain embodiments. In this example, a car insurance claims processing application (which is an example of a content management application 140) is implemented using an event driven content management system 120, and the checklist object 400 specifies the content objects (associated with placeholders) required to start processing a claim. The content management system 120 stores the documents associated with the claim processing system, and the checklist object 400 assists with collection of a set of documents required to process a particular car insurance claim. Each car insurance claim instance contains a checklist object 138 that will indicate whether the required documents have arrived to process the car insurance claim within a certain period of time.

The checklist object 400 includes metadata 410, five placeholders 420, 422, 424, 426, and 428, and a timer 440.

In this example, the metadata 410 may include a claims identification number, a customer identification number, and a customer name.

The placeholder for a first notice of loss 420 is a required object of type document, with the same claims identification number and the customer identification number as part of the metadata 410. Thus, the placeholder for a first notice of loss 420 waits for a single document.

The placeholder for a police report or property owner report 422 is a required object of type document, with the same claims identification number and the customer identification number as part of the metadata 410. For the placeholder for a police report or property owner report 422, either a police report is required (for accidents in public streets) or a property owners report is required (for accidents in private property) to fulfill the placeholder for a police report or property owner report 422. Thus, the placeholder for a police report or property owner report 422 waits one of two documents.

The placeholder for a field agent accident report 424 is an optional object of type document, with the same claims identification number and the customer identification number as part of the metadata 410. Thus, the placeholder for a field agent accident report 424 is an optional placeholder waiting for a single document.

The placeholder for witness statements folder 426 is a required object of type folder that should have some content with the same claims identification number and the customer identification number as part of the metadata 410.

The placeholder for a photographic evidence folder 428 is an optional folder object that is waiting for a single folder document.

In this example, the checklist timer 138 includes a single timer 440 for thirty days to indicate a "exceeding the collection time" condition. The timer 440 may be configured to start when the checklist object 400 is created and stop when the checklist object 400 is completed (i.e., all the required placeholders 420, 422, 424, 426, 428 have been fulfilled). In the event driven content management system 120 of this example, after the checklist object 400 is created, the checklist object 400 generates at least one event. Either the checklist object 400 is completed before thirty days and a checklist completed event is triggered, or the thirty days timer 440 expires without the checklist object 400 being completed and a "exceeding the collection time" event is triggered. In response to the event, the program 142 may perform an action.

Figure 5:
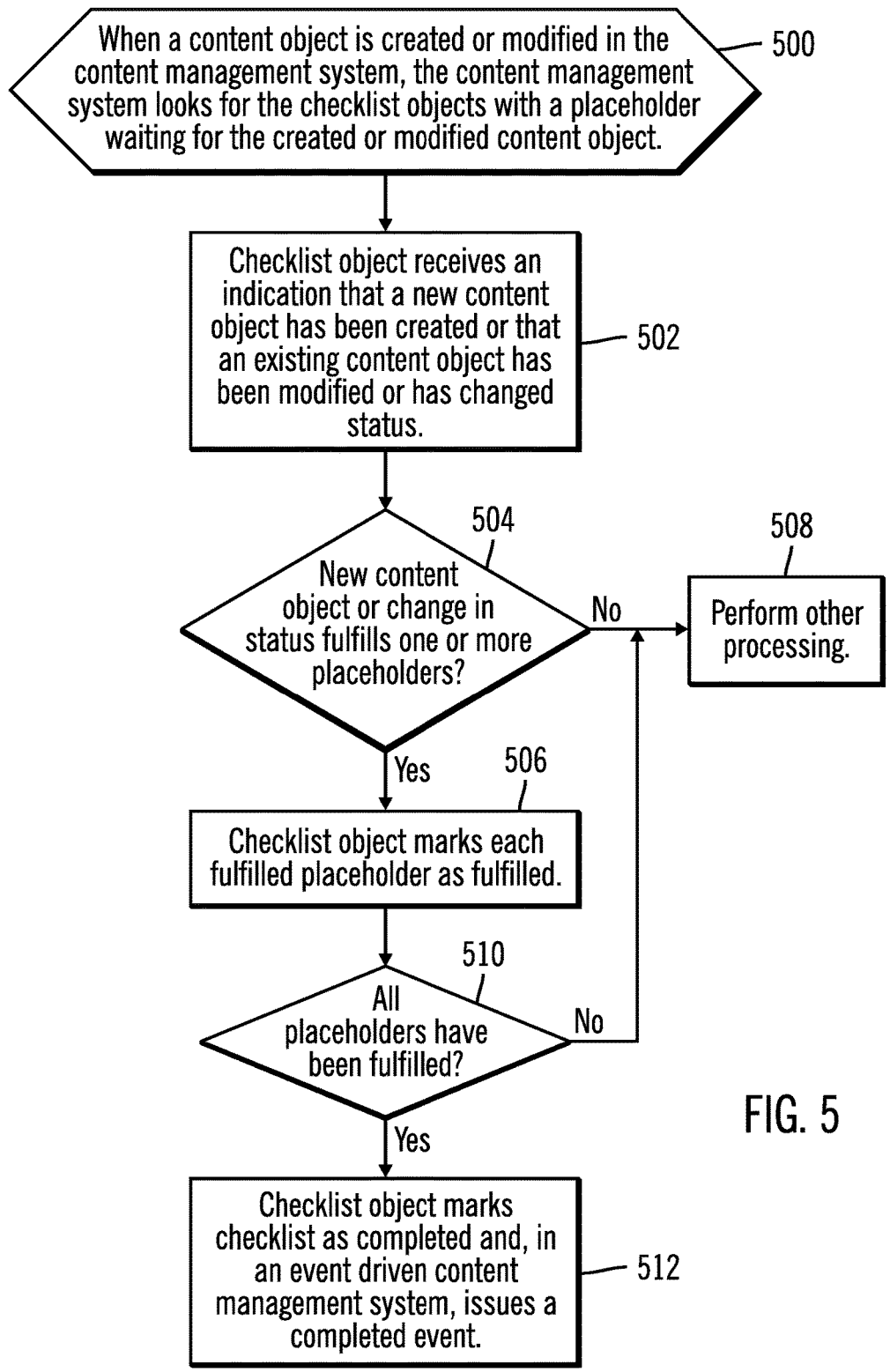
FIG. 5 illustrates logic performed by a checklist object in accordance with certain embodiments.

FIG. 5 illustrates logic performed by the checklist object 138 in accordance with certain embodiments. In block 500, when a content object 130 is created or modified in the content management system 120, the content management system 120 looks for the checklist objects 138 with a placeholder 154 waiting for the created or modified content object 130. In certain embodiments, this can be efficiently implemented by having a database table with the information of each active placeholder 154, so every time a content object 130 is created or modified, a query to this database table is issued.

In block 502, the checklist object 138 receives an indication from the content management system 120 that a new content object has been created or that an existing content object has been modified or changed status. In block 504, the checklist object 138, determines whether the new content object 130, modification of the existing content object 130 or change in status of the existing content object 130 fulfills one or more placeholders 154. If so, processing continues to block 506, otherwise, processing continues to block 508. In block 506, the checklist object 138, in response to determining that the new content object 130, modification of the existing content object 130 or change in status of the existing content object 130 fulfills one or more placeholders 154, marks each fulfilled placeholder 154 as fulfilled. In block 508, the checklist object 138 performs other processing.

From block 506, processing continues to block 510. In block 510, the checklist object 138 determines whether all placeholders have been fulfilled. If so, processing continues to block 512, otherwise, processing continues to block 508. In block 512, the checklist object 138, in response to determining that all placeholders have been fulfilled, marks the checklist as competed (i.e., by setting the completed flag 158) and, in an event driven content management system 120, issues a checklist completed event.

Figure 6:
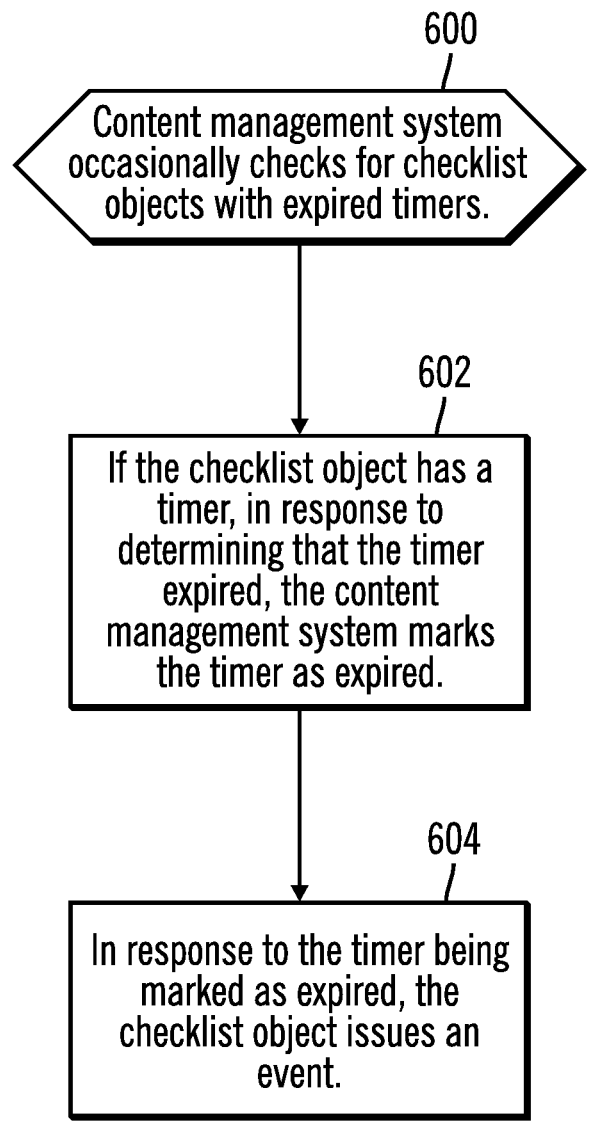
FIG. 6 illustrates event processing in accordance with certain embodiments.

FIG. 6 illustrates event processing in accordance with certain embodiments. Control begins in block 600 with the content management system 120 occasionally checking for checklist objects 138 with expired timers. This can be efficiently implemented by having a database table with the information about each checklist timer, including the calculated date and time that the timer will expire. The content management system 120 can query the database table every few seconds using the current time to find the expired timers.

In block 602, if the checklist object 138 has a timer 156, in response to determining that the timer 156 expired, the content management system 120 marks the timer as expired. In this manner, the Content Management system 120 notifies the checklist object 138 that the timer has expired. Then, in block 604, in response to the timer being marked as expired, the checklist object 138 issues an event. The event may indicate either that the one or more placeholders were fulfilled within the time period of the timer or that the one or more placeholders were not fulfilled within the time period of the timer. In certain embodiments, in a non-event driven content management system 120, the checklist object 138 may not include a timer 156. In certain embodiments, in a non-event driven content management system 120, the checklist object 138 does include a timer, and the checklist object 138 sets a flag indicating that the timer has expired.

Figure 7:
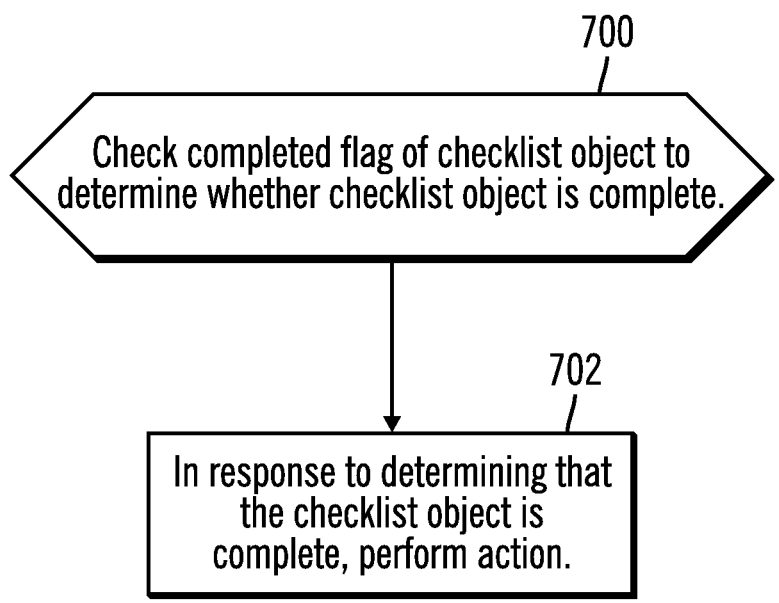
FIG. 7 illustrates logic performed by a program in a non-event driven content management system in accordance with certain embodiments.

FIG. 7 illustrates logic performed by a program 142 in a non-event driven content management system 120 in accordance with certain embodiments. Control begins in block 700 with the program 142 checking a completed flag 158 of a checklist object 138 to determine whether the checklist object 138 is complete. In block 702, the program 142, in response to determining that the checklist object 138 is complete, performs an action.

Many content management applications 140 benefit from having checklist objects 138. The checklist objects 138 are useful in both event driven content management systems 120 and non-event driven content management systems 120, because, in both cases, the checklist objects 138 simplify the creation of programs 142. The simplification is due to having programs 142 checking the checklist object 138 and not every single condition described by the placeholders 154. If there is no checklist object 138 with placeholders 154, the program 142 will need to do the work of checking all the conditions described by the placeholders 154.

Thus, embodiments simplify the implementations of content management applications 140 and programs 142 by eliminating the need of external applications, programs or business processes to keep track of activity happening in the content management system.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 8:
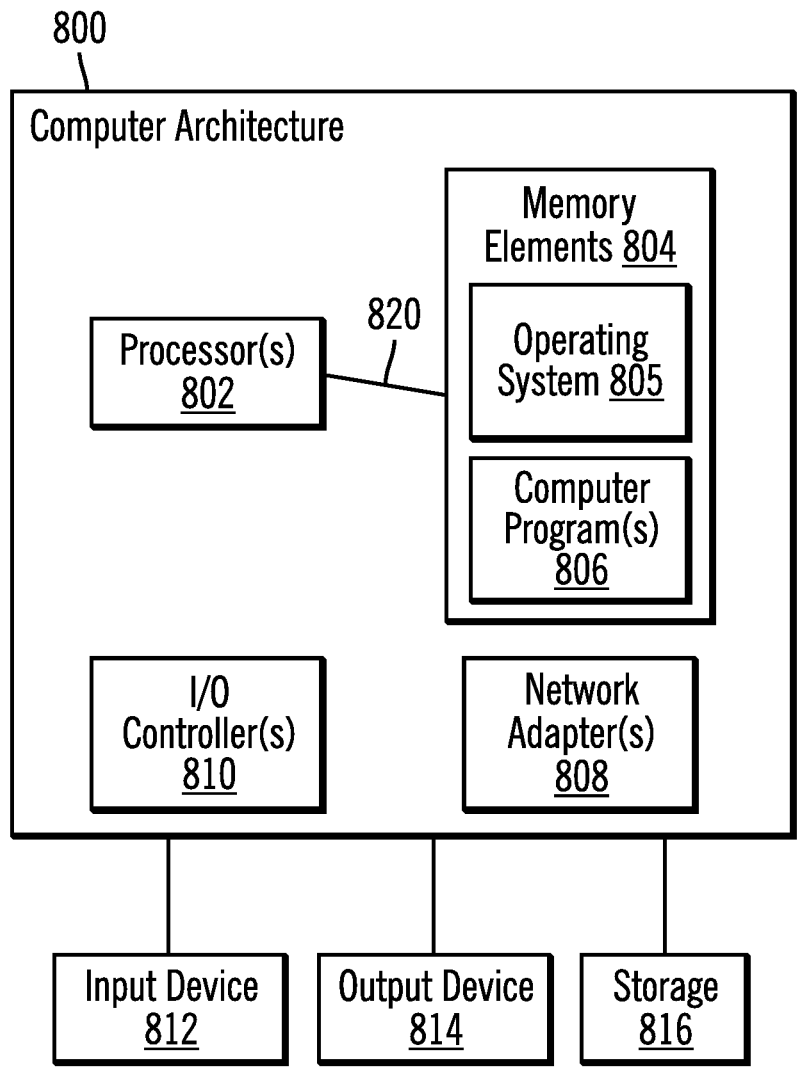
FIG. 8 illustrates a computer architecture that may be used in accordance with certain embodiments.

FIG. 8 illustrates a computer architecture 800 that may be used in accordance with certain embodiments. Computing device 110 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A computer-implemented method, comprising:
in a content management system storing content objects:
storing a first timer and a second timer in a checklist object, wherein the first timer specifies a period of time for completion of the checklist object, wherein the second timer specifies a period of time for fulfillment of a first placeholder that references a first content object of the content objects and a second placeholder that references a second content object of the content objects, and wherein fulfillment of the second placeholder is optional;
in response to the checklist object being created, starting the first timer and the second timer;
in response to the first placeholder being fulfilled and the second placeholder not being fulfilled within the period of time, indicating that the checklist object is complete; and in response to the checklist object being completed, stopping the first timer and the second timer.

2. The method of claim 1, further comprising:
in response to the first timer expiring, marking the first timer as expired.

3. The method of claim 1, further comprising:
providing a graphical representation of the checklist object for presentation to a user that displays the first placeholder and a link to any of a document object, a folder object, a link object, and another checklist object and displays the second placeholder and another link to any of a document object, a folder object, a link object, and another checklist object.

4. The method of claim 1, further comprising:
storing a date and a time when the period of time of the first timer will expire in a database table; and
in response to the first content object being one of created and modified, querying the database table to determine that the first placeholder has been fulfilled.

5. The method of claim 1, further comprising:
in response to the second timer expiring, marking the second timer as expired.

6. A system, comprising:
a processor; and
a storage device coupled to the processor, wherein the storage device stores a program, and wherein the processor is configured to execute the program to perform operations, the operations comprising:
in a content management system storing content objects:
storing a first timer and a second timer in a checklist object, wherein the first timer specifies a period of time for completion of the checklist object, wherein the second timer specifies a period of time for fulfillment of a first placeholder that references a first content object of the content objects and a second placeholder that references a second content object of the content objects, and wherein fulfillment of the second placeholder is optional;
in response to the checklist object being created, starting the first timer and the second timer;
in response to the first placeholder being fulfilled and the second placeholder not being fulfilled within the period of time, indicating that the checklist object is complete; and
in response to the checklist object being completed, stopping the first timer and the second timer.

7. The system of claim 6, wherein the operations further comprise:
in response to the first timer expiring, marking the first timer as expired.

8. The system of claim 6, wherein the operations further comprise:
providing a graphical representation of the checklist object for presentation to a user that displays the first placeholder and a link to any of a document object, a folder object, a link object, and another checklist object and displays the second placeholder and another link to any of a document object, a folder object, a link object, and another checklist object.

9. The system of claim 6, wherein the operations further comprise:
storing a date and a time when the period of time of the first timer will expire in a database table; and
in response to the first content object being one of created and modified, querying the database table to determine that the first placeholder has been fulfilled.

10. The system of claim 6, wherein the operations further comprise:
in response to the second timer expiring, marking the second timer as expired.

11. A computer program product comprising a non-transitory computer readable storage medium including a computer readable program, wherein the computer readable program when executed by a processor on a computer causes the computer to perform:
in a content management system storing content objects:
storing a first timer and a second timer in a checklist object, wherein the first timer specifies a period of time for completion of the checklist object, wherein the second timer specifies a period of time for fulfillment of a first placeholder that references a first content object of the content objects and a second placeholder that references a second content object of the content objects, and wherein fulfillment of the second placeholder is optional;
in response to the checklist object being created, starting the first timer and the second timer;
in response to the first placeholder being fulfilled and the second placeholder not being fulfilled within the period of time, indicating that the checklist object is complete; and
in response to the checklist object being completed, stopping the first timer and the second timer.

12. The computer program product of claim 11, wherein the computer readable program when executed by the processor on the computer causes the computer to:
in response to the first timer expiring, marking the first timer as expired.

13. The computer program product of claim 11, wherein the computer readable program when executed by the processor on the computer causes the computer to:
providing a graphical representation of the checklist object for presentation to a user that displays the first placeholder and a link to any of a document object, a folder object, a link object, and another checklist object and displays the second placeholder and another link to any of a document object, a folder object, a link object, and another checklist object.

14. The computer program product of claim 11, wherein the computer readable program when executed by the processor on the computer causes the computer to:
storing a date and a time when the period of time of the first timer will expire in a database table; and
in response to the first content object being one of created and modified, querying the database table to determine that the first placeholder has been fulfilled.

15. The computer program product of claim 11, wherein the computer readable program when executed by the processor on the computer causes the computer to:
in response to the second timer expiring, marking the second timer as expired.

* * * * *